(12) United States Patent
Zheng et al.

(10) Patent No.: US 10,141,787 B2
(45) Date of Patent: Nov. 27, 2018

(54) RECEIVING CIRCUIT FOR MAGNETIC COUPLING RESONANT WIRELESS POWER TRANSMISSION

(71) Applicant: EATON CAPITAL UNLIMITED COMPANY, Dublin (IE)

(72) Inventors: Gerald Zheng, Shenzhen (CN); Jack Gu, Shenzhen (CN); Bruce Wu, Shenzhen (CN); Tiefu Zhao, Shenzhen (CN); Jun Xu, Shenzhen (CN); Birger Pahl, Shenzhen (CN); Yahan Hua, Shenzhen (CN)

(73) Assignee: Eaton Capital Unlimited Company (IE)

( * ) Notice: Subject to any disclaimer, the term of this patent is extended or adjusted under 35 U.S.C. 154(b) by 16 days.

(21) Appl. No.: 15/123,088

(22) PCT Filed: Mar. 3, 2015

(86) PCT No.: PCT/CN2015/073545
§ 371 (c)(1),
(2) Date: Sep. 1, 2016

(87) PCT Pub. No.: WO2015/131794
PCT Pub. Date: Sep. 11, 2015

(65) Prior Publication Data
US 2017/0070082 A1 Mar. 9, 2017

(30) Foreign Application Priority Data
Mar. 5, 2014 (CN) .......................... 2014 1 0079414

(51) Int. Cl.
*H02J 7/00* (2006.01)
*H02J 50/12* (2016.01)
(Continued)

(52) U.S. Cl.
CPC .............. *H02J 50/12* (2016.02); *H02J 7/025* (2013.01); *H02J 7/045* (2013.01); *H02J 7/06* (2013.01);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

2010/0225271 A1* 9/2010 Oyobe .................... B60L 5/005
320/108
2012/0043172 A1* 2/2012 Ichikawa ................ B60L 5/005
191/45 R (Continued)

FOREIGN PATENT DOCUMENTS

| CN | 102892246 | 1/2013 |
|---|---|---|
| CN | 103117585 A | 5/2013 |

(Continued)

OTHER PUBLICATIONS

International Search Report Corresponding to International Application No. PCT/CN2015/073545, dated May 28, 2015, 2 Pages.
(Continued)

*Primary Examiner* — Arun Williams
(74) *Attorney, Agent, or Firm* — Ward and Smith, P.A.

(57) ABSTRACT

The present invention provides a receiving circuit for magnetic coupling resonant wireless power transmission comprising: a resonant circuit, which comprises a resonant coil and a resonant capacitor; a rectifying circuit, the input of which is electrically connected to the two terminals of the resonant capacitor; a storage capacitor, the two terminals of which are electrically connected to the output of rectifying circuit; and a DC-DC converter, the input of which is
(Continued)

electrically connected to the two terminals of the storage capacitor and the output of which is electrically connected to a rechargeable battery. The receiving circuit for magnetic coupling resonant wireless power transmission of the present invention can save energy and has high charge efficiency.

18 Claims, 6 Drawing Sheets

(51) Int. Cl.
| | | |
|---|---|---|
| *H02J 50/80* | (2016.01) | |
| *H02J 7/02* | (2016.01) | |
| *H02M 3/156* | (2006.01) | |
| *H02J 7/06* | (2006.01) | |
| *H02J 7/04* | (2006.01) | |
| *H02M 7/06* | (2006.01) | |
| *H02J 7/10* | (2006.01) | |

(52) U.S. Cl.
CPC ............. *H02J 50/80* (2016.02); *H02M 3/156* (2013.01); *H02J 2007/10* (2013.01); *H02J 2007/105* (2013.01); *H02M 7/06* (2013.01); *Y02B 40/90* (2013.01); *Y02B 70/1425* (2013.01)

(58) Field of Classification Search
USPC ......................................................... 320/108
See application file for complete search history.

(56) References Cited

U.S. PATENT DOCUMENTS

| | | | |
|---|---|---|---|
| 2012/0183097 A1 | 7/2012 | Ishizaki | |
| 2012/0293009 A1 | 11/2012 | Kim et al. | |
| 2013/0033118 A1 | 2/2013 | Karalis et al. | |
| 2013/0147279 A1 | 6/2013 | Muratov | |
| 2013/0336017 A1* | 12/2013 | Uno ................. | H02M 3/33507 363/21.02 |
| 2015/0137788 A1* | 5/2015 | Li .......................... | H02M 3/158 323/311 |
| 2016/0043634 A1* | 2/2016 | Bernat ................ | H02M 1/4225 713/300 |

FOREIGN PATENT DOCUMENTS

| | | |
|---|---|---|
| JP | 2011234551 A | 11/2011 |
| JP | 2013115961 A | 6/2013 |
| WO | WO 2013/160960 A1 | 10/2013 |

OTHER PUBLICATIONS

Ridley, Dr. Ray, "The Nine Most Useful Power Topologies," Power Systems Design Europe, Oct. 2007, pp. 15-18.
Extended European Search Report, EP Application No. 15 758 075.4, dated Oct. 5, 2017, 9 pages.

* cited by examiner

RECEIVING CIRCUIT FOR MAGNETIC COUPLING RESONANT WIRELESS POWER TRANSMISSION

RELATED APPLICATIONS

The present application is a 35 U.S.C. § 371 national phase application of PCT International Application No. PCT/CN2015/073545, having an international filing date of Mar. 3, 2015, claiming priority to Chinese Patent Application No. 201410079414.8 filed Mar. 5, 2014. The disclosures of each application are incorporated herein by reference in their entireties. The above PCT International Application was published in the Chinese language as International Publication No. WO 2015/131794.

FIELD OF THE INVENTION

The present invention relates to power electronics, and particularly, to a receiving circuit of a magnetic coupling resonant wireless power transmission system.

BACKGROUND OF THE INVENTION

Conventional electrical devices are usually supplied with power in a wired mode. In the wired mode, it is necessary to connect the electrical device and the power supply device via conductive wires, so that the power supply device can supply electricity. Even power transmission in a short distance also needs electric wires and cables to supply electricity. In some cases, supplying power in the wired mode is not convenient. If the electrical device can be supplied with electricity in a wireless mode, the electrical device can be disconnected from the power supply, and thus powering the electrical device will become very convenient.

The wireless energy transmission technology is a process which transmits electricity from electricity transmitter to loads without using conventional electric wires. Currently, the domestic and abroad study mainly focuses on supplying electricity to the electrical device using magnetic coupling resonant wireless power transmission technology. In the magnetic coupling resonant wireless power transmission technology, especially in the process of charging a rechargeable battery, the utilization of electrical energy is a very important parameter.

FIG. 1 illustrates a receiving circuit for wireless power transmission in prior art, which consists of a resonant circuit 7, a full bridge rectifying circuit 8, a LC filtering circuit 9 and a diode D10, wherein the resonant circuit 7 consists of an inductor L6, a capacitor C11 and a capacitor 10, the full bridge rectifying circuit 8 consists of four diodes D6-D9, the LC filtering circuit 9 consists of an inductor L7 and a capacitor C12. The resonant circuit 7, full bridge rectifying circuit 8 and LC filtering circuit 9 of FIG. 1 are known in the art, and thus are not described in detail herein. During the process of charging the rechargeable battery B by the receiving circuit for wireless power transmission in prior art, a resonant transmitting circuit (not shown in FIG. 1) generates an alternating magnetic field, such that the inductor L6 of the resonant circuit 7 has an alternating magnetic field, thereby generating an electromotive force across the two terminals of the capacitor 11. The full bridge rectifying circuit 8 rectifies the electromotive force and outputs a rectified voltage to the LC filtering circuit 9. A DC is obtained at two terminals of the capacitor C12 after filtering, and finally the rechargeable battery B is charged via the diode D10. With the increase of charging time and the energy stored in the rechargeable battery B, the transmission efficiency of electrical energy becomes lower and lower. A lot of electrical energy will be lost as heat at the latter period of charging the rechargeable battery B, thereby reducing the utilization of electrical energy, and resulting in increased temperature of components in the receiving circuit, which may damage the electronic components in the receiving circuit.

SUMMARY OF THE INVENTION

According to the above-mentioned prior art, an embodiment of the present invention provides a receiving circuit for magnetic coupling resonant wireless power transmission solving the above-mentioned technical problems, which comprises:

a resonant circuit, which comprises a resonant coil and a resonant capacitor;

a rectifying circuit, the input of which is electrically connected to the two terminals of the resonant capacitor;

a storage capacitor, the two terminals of which are electrically connected to the output of rectifying circuit;

a DC-DC converter, the input of which is electrically connected to the two terminals of the storage capacitor and the output of which is electrically connected to a rechargeable battery.

Preferably, the DC-DC converter is a Boost circuit.

Preferably, the Boost circuit comprises an inductor, a diode and a metal oxide semiconductor field effect transistor, wherein a terminal of the inductor is electrically connected to a terminal of the storage capacitor, the other terminal of the inductor is electrically connected to the anode of the diode and the drain of the metal oxide semiconductor field effect transistor, the source of the metal oxide semiconductor field effect transistor is electrically connected to the other terminal of the storage capacitor, the cathode of the diode and the source of the metal oxide semiconductor field effect transistor act as the output of the Boost circuit. In other preferred embodiments, the receiving circuit for magnetic coupling resonant wireless power transmission further comprises a filtering capacitor and a first switch, which are connected in series and then are electrically connected to the drain and source of the metal oxide semiconductor field effect transistor. In other preferred embodiments, the receiving circuit for magnetic coupling resonant wireless power transmission further comprises a second switch, wherein the second switch and a diode in the Boost circuit are connected in parallel.

Preferably, the rectifying circuit is a full bridge rectifying circuit.

Preferably, the load is a rechargeable battery.

The present invention further provides a magnetic coupling resonant wireless power transmission circuit comprising a resonant transmitting circuit and a receiving circuit for magnetic coupling resonant wireless power transmission, wherein the receiving circuit comprises: a resonant circuit, which comprises a resonant coil and a resonant capacitor; a rectifying circuit, the input of which is electrically connected to the output of the resonant circuit; a storage capacitor, the two terminals of which are electrically connected to the output of rectifying circuit; and a Boost circuit comprising an inductor, a diode and a metal oxide semiconductor field effect transistor, wherein a terminal of the inductor is electrically connected to a terminal of the storage capacitor, the other terminal of the inductor is electrically connected to the anode of the diode and the drain of the metal oxide semiconductor field effect transistor, the source of the metal oxide semiconductor field effect transistor is electrically connected to the other terminal of the storage capacitor, the cathode of the diode and the source of the metal oxide semiconductor field effect transistor act as the output of the Boost circuit which is electrically connected to a rechargeable battery, the resonant transmitting circuit comprises a semiconductor switch.

Preferably, the receiving circuit for magnetic coupling resonant wireless power transmission further comprises a filtering capacitor and a first switch, which are connected in series and then are electrically connected to the drain and source of the metal oxide semiconductor field effect transistor.

Preferably, the receiving circuit for magnetic coupling resonant wireless power transmission further comprises a second switch, wherein the second switch and a diode in the Boost circuit are connected in parallel.

Preferably, the magnetic coupling resonant wireless power transmission circuit further comprises: a main control device including a main CPU, a main transceiver module and a first driver module; a sub control device including a sub CPU, a sub transceiver module and a second driver module; a charging detection module for detecting a charging status of the rechargeable battery and outputting charging status data of the rechargeable battery to the sub CPU; a voltage detection module for detecting a voltage of the storage capacitor and outputting a voltage value of the storage capacitor to the sub CPU; wherein the sub CPU is configured to transmit the charging status data and the voltage value of the storage capacitor to the main CPU via the sub transceiver module and the main transceiver module, the main CPU is configured to control the semiconductor switch to operate in a pulse frequency modulation via the first driver module according to the charging status data and the voltage value of the storage capacitor, the sub CPU is configured to control the metal oxide semiconductor field effect transistor to switch off and control the first switch and the second switch to be in on-state or off-state simultaneously via the second driver module according to the charging status data and the voltage value of the storage capacitor; or the sub CPU is configured to transmit the charging status data and the voltage value of the storage capacitor to the main CPU via the sub transceiver module and the main transceiver module, the main CPU is configured to control the semiconductor switch to switch off via the first driver module according to the charging status data and the voltage value of the storage capacitor, the sub CPU is configured to control the metal oxide semiconductor field effect transistor to operate in a pulse width modulation and control the first switch and the second switch to be in off-state simultaneously via the second driver module according to the charging status data and the voltage value of the storage capacitor.

The present invention further provides a control method for the magnetic coupling resonant wireless power transmission circuit, comprising the following steps: (a) when the voltage of the rechargeable battery is lower than a first predetermined threshold voltage, controlling the resonant transmitting circuit to operate in a pulse frequency modulation and the metal oxide semiconductor field effect transistor to switch off; (b) when the voltage of the rechargeable battery is higher than the first predetermined threshold voltage, controlling the resonant transmitting circuit to work intermittently, wherein when the voltage value of the storage capacitor is higher than a second predetermined threshold voltage, controlling the resonant transmitting circuit to switch off and the metal oxide semiconductor field effect transistor to operate in a pulse width modulation, so that the storage capacitor charges the rechargeable battery via the Boost circuit; and when the voltage value of the storage capacitor is lower than the second predetermined threshold voltage, controlling the resonant transmitting circuit to operate in a pulse frequency modulation and the metal oxide semiconductor field effect transistor to switch off, so that the resonant transmitting circuit charges the storage capacitor via the resonant circuit and the rectifying circuit.

Preferably, the receiving circuit for magnetic coupling resonant wireless power transmission further comprises a filtering capacitor and a first switch, wherein the filtering capacitor and the first switch are connected in series and then are electrically connected to the drain and source of the metal oxide semiconductor field effect transistor, in the step (a), the control method further comprises controlling the first switch to switch on; and in the step (b), the control method further comprises controlling the first switch to switch off.

Preferably, the receiving circuit for magnetic coupling resonant wireless power transmission further comprises a second switch, wherein the second switch and a diode in the Boost circuit are connected in parallel, in the step (a), the control method further comprises controlling the second switch to switch on; and in the step (b), the control method further comprises controlling the second switch to switch off.

When the voltage of the rechargeable battery reaches a predetermined threshold voltage or the power required by the load is reduced, the receiving circuit for magnetic coupling resonant wireless power transmission of the present invention can charge the rechargeable battery or supply electricity to the load by using the electrical energy in the storage capacitor. It improves the utilization of electrical energy and reduces the heat loss of the electronic components.

BRIEF DESCRIPTION OF THE DRAWINGS

Below, embodiments of the present invention are further described with reference to the drawings, wherein.

Figure 1:
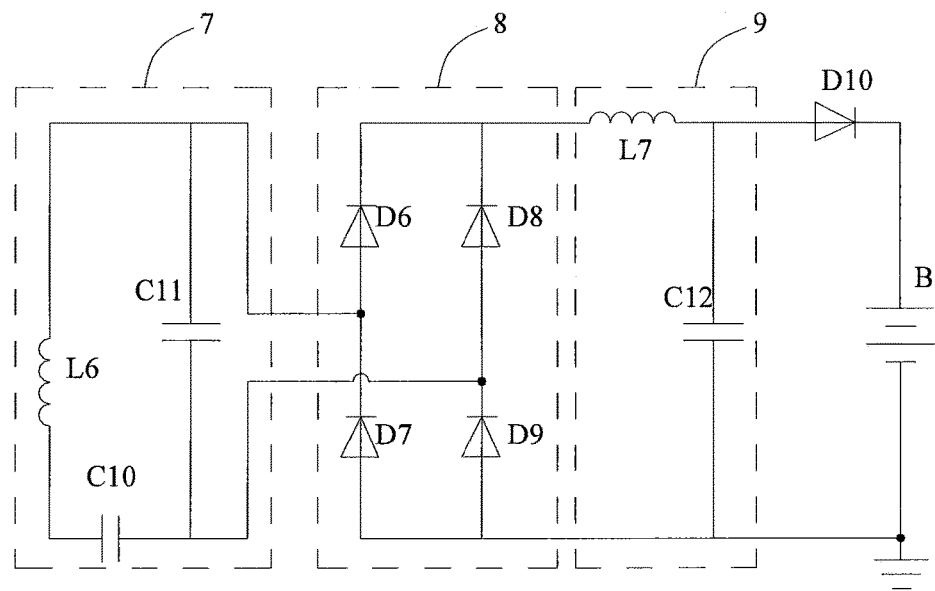
FIG. 1 is a circuit diagram of a receiving circuit for magnetic coupling resonant wireless power transmission in prior art.

REFERENCE SYMBOLS 1 resonant circuit
2 full bridge rectifying circuit
3 Boost circuit
4 resonant circuit
5 resonant transmitting circuit
6 semiconductor switch
7 charging detection module
8 voltage detection module
9 main CPU
10 main transceiver module
11 first driver module
12 main control device
13 sub CPU
14 sub transceiver module
15 second driver module
16 sub control device
C1, C4, C9 resonant capacitor
C2 storage capacitor
C3 capacitor
L1, L5 resonant inductor
L2 inductor
D1-D5 diode
Q1 metal oxide semiconductor field effect transistor
S first switch
S2 second switch
B rechargeable battery

DETAILED DESCRIPTION OF THE INVENTION

In order to make the objects, technical solutions and advantages of the present invention more apparent, the present invention is further described in detail by using the specific embodiments below, with reference to the drawings.

Figure 2:
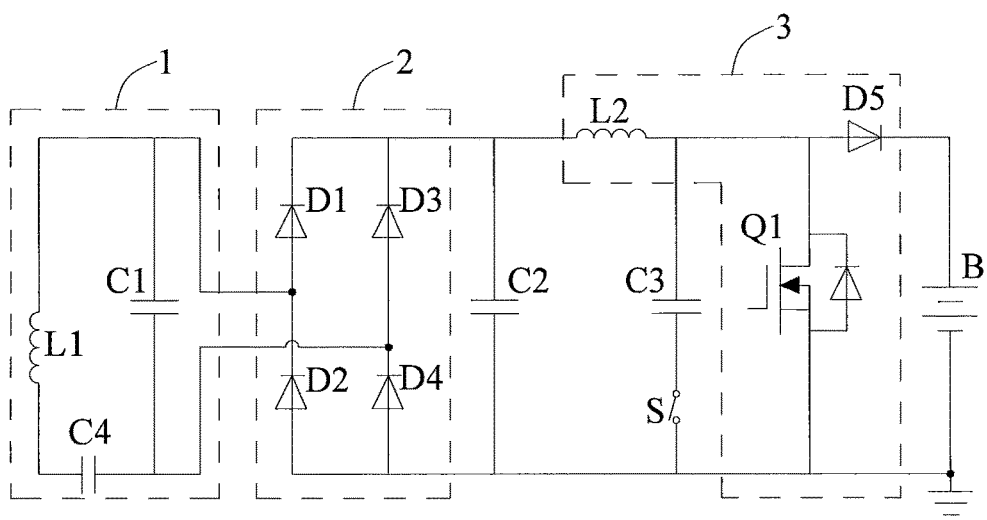
FIG. 2 is a circuit diagram of a receiving circuit for magnetic coupling resonant wireless power transmission according to a first embodiment of the present invention.

FIG. 2 is a circuit diagram of a receiving circuit for magnetic coupling resonant wireless power transmission according to a first embodiment of the present invention. As shown in FIG. 2, the receiving circuit for magnetic coupling resonant wireless power transmission comprises a resonant circuit 1, a full bridge rectifying circuit 2, a Boost circuit 3, a storage capacitor C2, a storage capacitor C3 and a first switch S. The resonant circuit 1 comprises a resonant inductor L1, a resonant capacitor C4 and a resonant capacitor C1 which connected in series in a ring, i.e., a terminal of the resonant inductor L1 is electrically connected to a terminal of the resonant capacitor C1, the other terminal of the resonant capacitor C1 is electrically connected to a terminal of the resonant capacitor C4, and the other terminal of the resonant capacitor C4 is electrically connected to the other terminal of the resonant inductor L1, wherein, in the present embodiment, the two terminals of the resonant capacitor C1 act as the output of the resonant circuit 1. The full bridge rectifying circuit 2 comprises four diodes D1-D4, wherein the anode of the diode D1 is connected to the cathode of the diode D2, the anode of the diode D3 is connected to the cathode of the diode D4, the cathode of the diode D1 is connected to the cathode of the diode D3, and the anode of the diode D2 is connected to the anode of the diode D4. The anode of the diode D1 and the anode of the diode D3 act as the input of the full bridge rectifying circuit 2, and the cathode of the diode D1 and the anode of the diode D2 act as the output of the full bridge rectifying circuit 2. The input of the full bridge rectifying circuit 2 is connected to the two terminals of the resonant capacitor C1, and the output of the full bridge rectifying circuit 2 is connected to the two terminals of the storage capacitor C2. The Boost circuit 3 comprises an inductor L2, a diode D5 and a metal oxide semiconductor field effect transistor Q1, wherein a terminal of the inductor L2 is connected to both the anode of the diode D5 and the drain of the metal oxide semiconductor field effect transistor Q1, the other terminal of the inductor L2 is connected to the cathode of the diode D3, and the source of the metal oxide semiconductor field effect transistor Q1 is connected to the anode of the diode D4. The terminal of the inductor L2 connected to the cathode of the diode D3 and the source of the metal oxide semiconductor field effect transistor Q1 act as the input of the Boost circuit 3, and the cathode of the diode D5 and the source of the metal oxide semiconductor field effect transistor Q1 act as the output of the Boost circuit 3. The capacitor C3 and the first switch S are connected in series and then are connected to the drain and source of the metal oxide semiconductor field effect transistor Q1. The positive terminal of the rechargeable battery B is connected to cathode of the diode D5, and the negative terminal of the rechargeable battery B is connected to the source of the metal oxide semiconductor field effect transistor Q1 and the ground.

Figure 3:
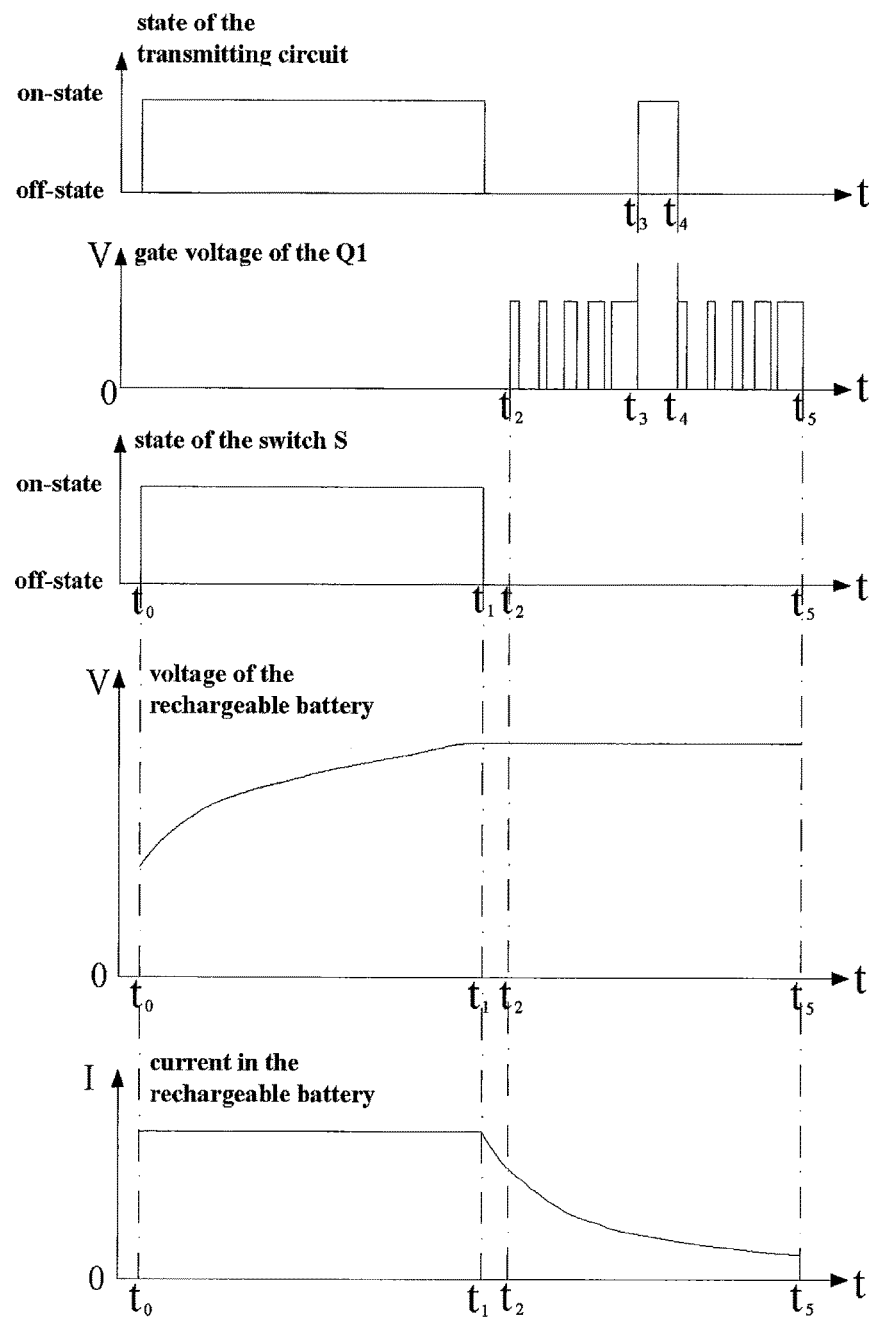
FIG. 3 is a timing diagram of the receiving circuit for magnetic coupling resonant wireless power transmission shown in FIG. 2.
Figure 4:
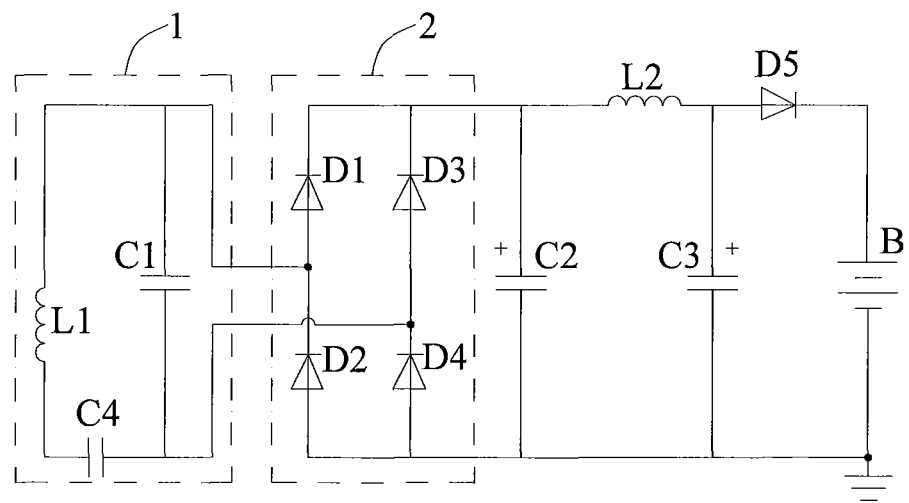
FIG. 4 is an equivalent circuit diagram of the receiving circuit for magnetic coupling resonant wireless power transmission in time $t_0$-$t_1$ of FIG. 3.

FIG. 3 is a timing diagram of the receiving circuit for magnetic coupling resonant wireless power transmission shown in FIG. 2. As shown in FIG. 3, in time $t_0$-$t_1$, the resonant transmitting circuit is operated in a pulse frequency modulation (PFM) mode, the gate voltage of the metal oxide semiconductor field effect transistor Q1 is a low voltage level (in this case, the metal oxide semiconductor field effect transistor Q1 is in an off-state), and the first switch S is in an on-state, thus the current in the rechargeable battery B basically remains unchanged and the voltage across the rechargeable battery B constantly increases, i.e., the rechargeable battery B is in a constant current charge mode. The specific equivalent circuit diagram is shown in FIG. 4. Since the first switch S keeps in an on-state and the metal oxide semiconductor field effect transistor Q1 keeps in an off-state, they are not shown in FIG. 4. The storage capacitor C2, the inductor L2 and the capacitor C3 constitute a π-type filter and are connected to the output of the full bridge rectifying circuit 2. A resonant transmitting coil in the resonant transmitting circuit (not shown in the FIG. 4) generates a resonant current which has the same frequency as the resonant transmitting frequency. The resonant current in the resonant transmitting coil generates an alternating magnetic field. By making the resonant receiving frequency set by the resonant inductor L1, the resonant capacitors C1 and C4 is the same as the resonant transmitting frequency, when the resonant transmitting circuit is within a certain distance from the resonant circuit 1, the energy is transmitted due to resonance generated by electromagnetic coupling. The input of the full bridge rectifying circuit 2 is connected to the two terminals of the resonant capacitor C1, so that the full bridge rectifying circuit 2 rectifies the electromotive force of the resonant capacitor C1 and outputs a pulsating direct current. The pulsating direct current is filtered by the π-type filter, and the capacitor C3 outputs a direct current. The storage capacitor C2 also stores a certain amount of electric energy at the same time. Since the terminal of the capacitor C3 connected to the anode of the diode D5 is positively charged, the chargeable battery B can be charged. At the beginning of charging the chargeable battery B or when the voltage across the chargeable battery B is lower than a predetermined threshold voltage, the chargeable battery is in the constant current charge mode, wherein the threshold voltage may be a percentage value of the rated voltage of the chargeable battery B, for example, the threshold voltage may be 90% of the rated voltage of the chargeable battery B.

Figure 5:
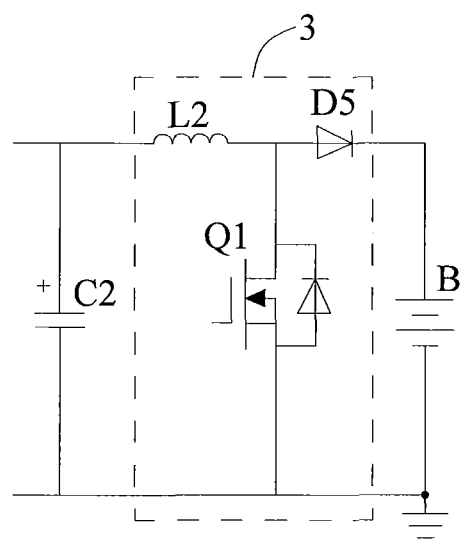
FIG. 5 is an equivalent circuit diagram of the receiving circuit for magnetic coupling resonant wireless power transmission in time $t_2$-$t_3$ of FIG. 3.

In time $t_2$-$t_3$, the voltage across the chargeable battery B is close to its rated voltage or a predetermined threshold voltage, the resonant transmitting circuit is in the off-state, a pulse width modulation controller (not shown in FIG. 2) provides a pulse width modulation signal to the gate of the metal oxide semiconductor field effect transistor Q1, and the first switch is in the off-state. A specific equivalent circuit is shown in FIG. 5. The resonant circuit 1 and the full bridge rectifying circuit 2 do not work at this time, and therefore are not shown in FIG. 5. The Boost circuit 3 is a DC-DC converter and can output a voltage which is higher than the input voltage when the metal oxide semiconductor field effect transistor Q1 is operated in the PWM mode. Since the storage capacitor C2 stores a certain amount of electric energy, the Boost circuit 3 converts the direct current of the storage capacitor C2 into a higher direct current and outputs it, thereby continually charging the chargeable battery B. In time $t_2$-$t_3$, the voltage across the rechargeable battery B is essentially unchanged, and the current in the rechargeable battery B reduces gradually, i.e., the rechargeable battery B is in a constant voltage charge mode. In the constant voltage charge mode, the rechargeable battery B can be further charged with the electric energy in the storage capacitor C2, which can save electric energy, improve the charge efficiency, and reduces the risk of overcharging the rechargeable battery B.

Figure 6:
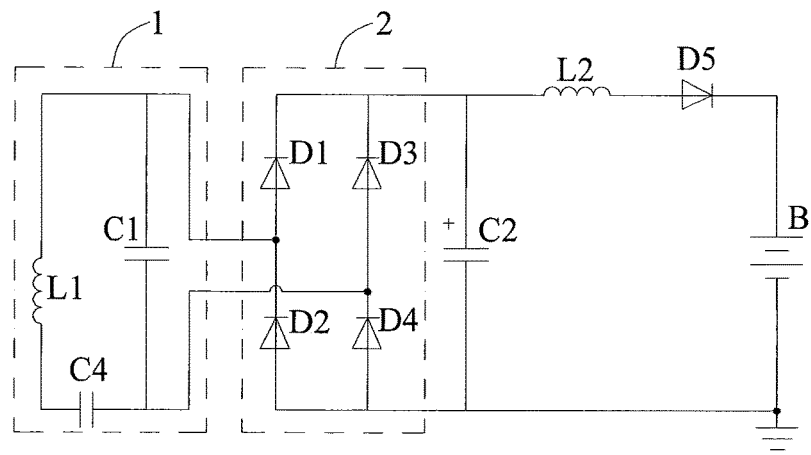
FIG. 6 is an equivalent circuit diagram of the receiving circuit for magnetic coupling resonant wireless power transmission in time $t_3$-$t_4$ of FIG. 3.

In time $t_3$-$t_4$, when the electric energy on the storage capacitor C2 cannot steadily charge the rechargeable battery B, the resonant transmitting circuit is operated in the PFM mode, and the metal oxide semiconductor field effect transistor Q1 and the first switch are in the off-state. A specific equivalent circuit is shown in FIG. 6. The storage capacitor C2 is charged by the circuit shown in FIG. 6.

In time $t_4$-$t_5$, the resonant transmitting circuit is in the off-state, the pulse width modulation controller provides a pulse width modulation signal to the gate of the metal oxide semiconductor field effect transistor Q1, and the first switch S is in the off-state. The equivalent circuit is the same as FIG. 5, and the chargeable battery B is charged continually by the electric energy in the storage capacitor C2.

In the timing diagram shown in FIG. 3, the rechargeable battery B is in the constant current charge mode in time $t_0$-$t_1$ and in the constant voltage charge mode in time $t_2$-$t_5$. In time $t_2$-$t_5$, the resonant transmitting circuit operates intermittently, i.e., when the resonant transmitting circuit does not work, the storage capacitor C2 charges the rechargeable battery B, and when the resonant transmitting circuit is operated in the PFM mode, the storage capacitor C2 is charged, therefore, the storage capacitor C2 discharges and recharges alternately. The time $t_1$-$t_2$ is a transient time in which the constant current charge mode converts into the constant voltage charge mode. In the actual charging process, the time $t_1$-$t_2$ is very short and can be neglected. In other embodiments of the present invention, in a predetermined time period after the time $t_2$, the resonant transmitting circuit can be in the on-state, and the metal oxide semiconductor field effect transistor Q1 and the first switch S can be in the off-state. Thereafter, the magnetic coupling resonant wireless power transmission circuit can operate in the same manner as that of the present embodiment in time $t_2$-$t_5$.

In other embodiments, a storage capacitor C2 with large storage capacity can be chosen. In the constant voltage charge mode of the rechargeable battery B, the storage capacitor C2 has enough electric energy for charging the rechargeable battery B, so that the frequency of turning on the resonant transmitting circuit can be reduced in the constant voltage charge mode.

Figure 7:
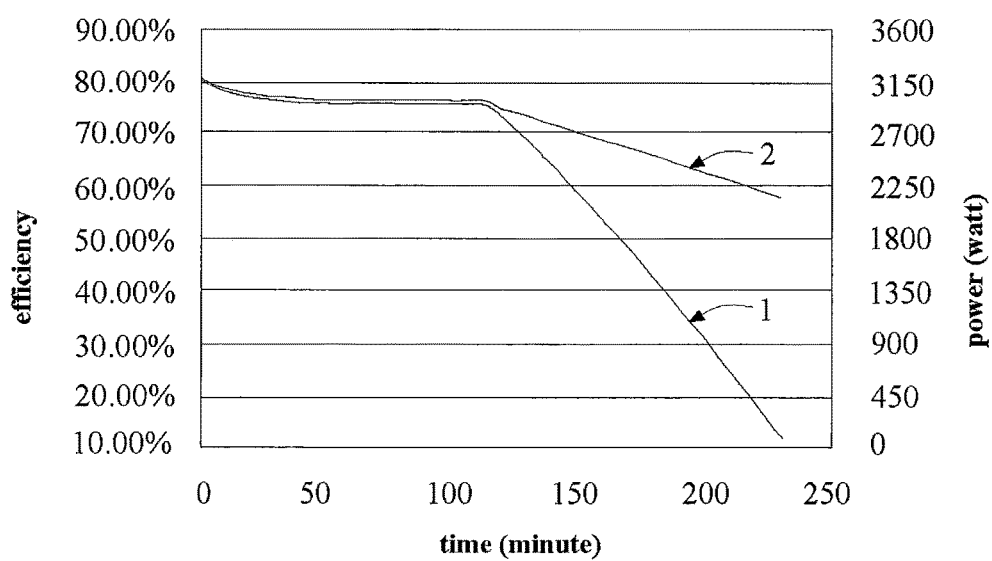
FIG. 7 is charge efficiency curves when the receiving circuit for magnetic coupling resonant wireless power transmission shown in FIG. 2 and the receiving circuit shown in FIG. 1 charge the rechargeable battery respectively.

FIG. 7 is charge efficiency curves when the receiving circuit for magnetic coupling resonant wireless power transmission shown in FIG. 2 and the receiving circuit shown in FIG. 1 charge the rechargeable battery respectively. As shown in FIG. 7, the curve 1 is charge efficiency curve when the receiving circuit shown in FIG. 1 charges the rechargeable battery, and the curve 2 is charge efficiency curve when the receiving circuit for magnetic coupling resonant wireless power transmission shown in FIG. 2 charges the rechargeable battery. As shown in FIG. 7, the curve 1 and the curve 2 are basically the same in about 0-100 minutes, indicating that the charge efficiencies are basically the same in the constant current charge mode. The charge efficiencies of the curve 2 and the curve 1 decrease with the increase of the charging time in about 100-200 minutes; however, at the same time point, the efficiency of the curve 2 is significantly higher than that of the curve 1, indicating that the charge efficiency of the receiving circuit shown in FIG. 2 of the present invention is higher than that of the receiving circuit shown in FIG. 1 in the constant voltage charge mode.

Figure 8:
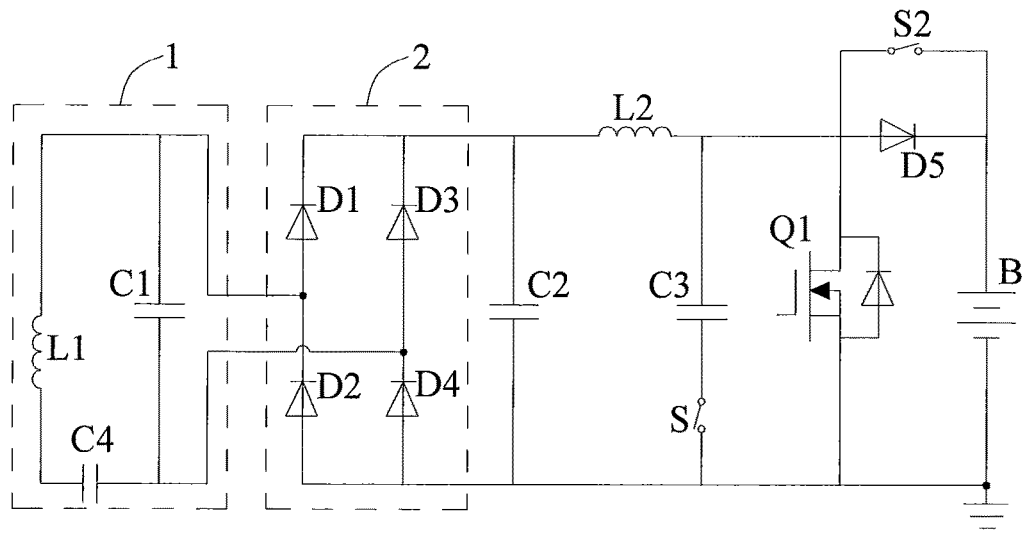
FIG. 8 is a circuit diagram of a receiving circuit for magnetic coupling resonant wireless power transmission according to a second embodiment of the present invention.

FIG. 8 is a circuit diagram of a receiving circuit for magnetic coupling resonant wireless power transmission according to a second embodiment of the present invention, which is similar to that shown in FIG. 2. The difference is that a second switch S2 is connected in parallel to the diode D5. In the constant current charge mode of the rechargeable battery B, the second switch S2 is controlled to switch on so as to short out the diode D5. After filtering, a direct current obtained in the capacitor C3 charges the rechargeable battery B directly, so that the electric energy consumed by the diode D5 in the constant current charge mode is saved. In the constant voltage charge mode of the rechargeable battery B, the second switch S2 is switched off, the direct current in the storage capacitor C2 charges the rechargeable battery B via the Boost circuit 3.

Figure 9:
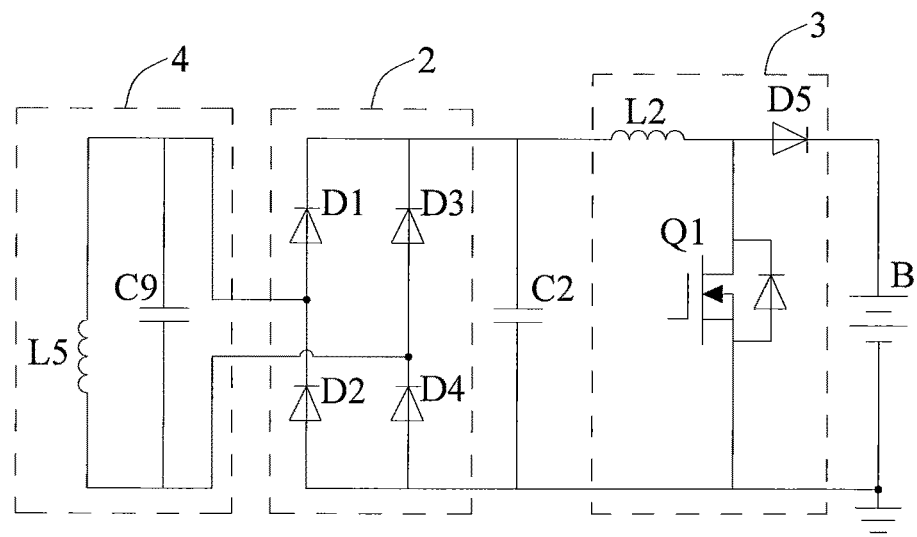
FIG. 9 is a circuit diagram of a receiving circuit for magnetic coupling resonant wireless power transmission according to a third embodiment of the present invention.

FIG. 9 is a circuit diagram of a receiving circuit for magnetic coupling resonant wireless power transmission according to a third embodiment of the present invention, which is similar to that shown in FIG. 2. The difference is that the resonant circuit 4 is a LC resonant circuit consisting of a resonant inductor L5 and a resonant capacitor C9, wherein the two terminals of the resonant capacitor C9 are the output of the resonant circuit 4. A terminal of the resonant inductor L5 is connected to a terminal of the resonant capacitor C9, the other terminal of the resonant inductor L5 is connected to the other terminal of the resonant capacitor C9, and the input of the full bridge rectifying circuit 2 is connected to the two terminals of the resonant capacitor C9. In addition, FIG. 9 does not have the first switch S and the capacitor C3 shown in FIG. 2. In the constant voltage charge mode, the output voltage of the Boost circuit 3 is higher than the voltage across the storage capacitor C2 and the voltage across the rechargeable battery B, thereby continually charging the chargeable battery B. In a variation of the present embodiment, a relay switch can be connected in parallel to the diode D5.

In other embodiments, the full bridge rectifying circuit 2 of the above embodiment can be replaced with a half bridge rectifying circuit. In addition, the DC-DC converter of the present invention is not limited to the Boost circuit 3, and any DC-DC converter which can boost the voltage across the storage capacitor can be employed. In some embodiments, the metal oxide semiconductor field effect transistor Q1 of the above embodiment can be replaced with a semiconductor switch element, for example an insulated gate bipolar transistor (IGBT), wherein the collector of the IGBT is connected to the anode of the diode D5, and the emitter of the IGBT is connected to the anode of the diode D4. In other embodiments, the capacitor C2 of the present invention may be a single capacitor or a set of capacitors connected in parallel which increase the energy storage capacity of electric energy. In addition to charging the rechargeable battery B, the present invention can also be utilized to supply power to a load with a required power which changes significantly, for example, when the load requires a high power, the load is powered in the constant current charge mode, and when the load requires a low power, the load is powered with electric energy in the storage capacitor C2, so as to improve the utilization of electrical energy.

Figure 10:
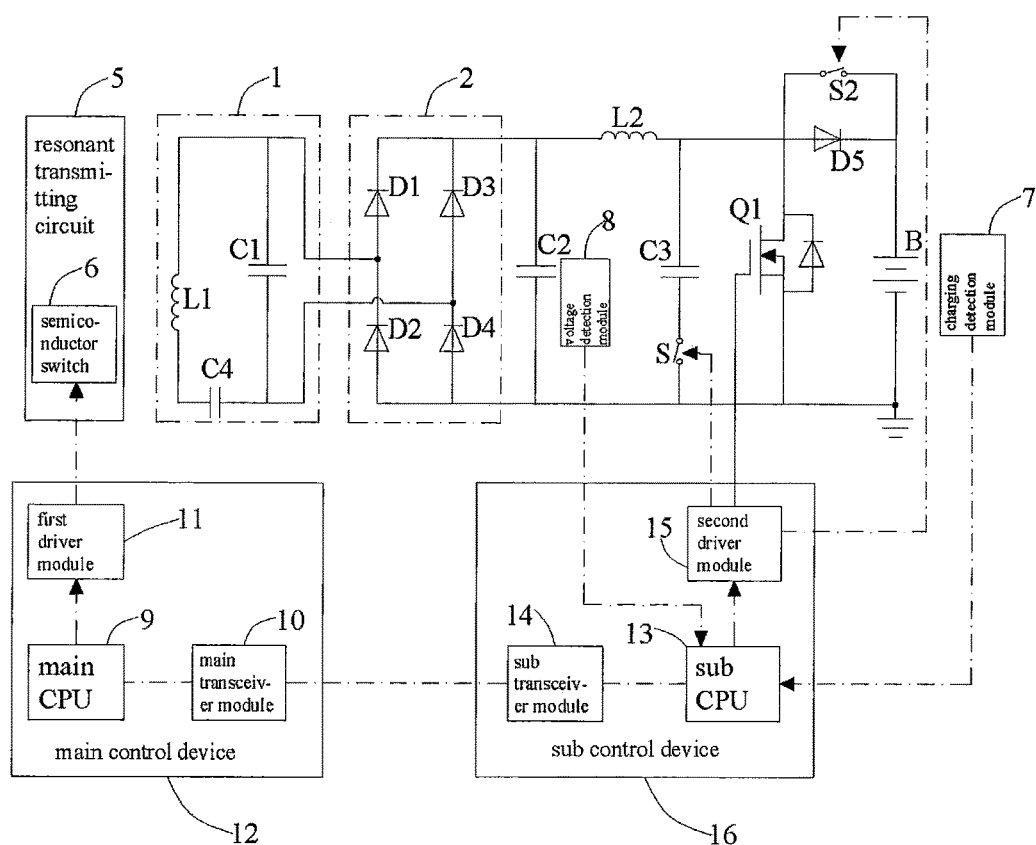
FIG. 10 is a circuit diagram of a magnetic coupling resonant wireless power transmission circuit according to a preferred embodiment of the present invention.

FIG. 10 is a circuit diagram of a magnetic coupling resonant wireless power transmission circuit according to a preferred embodiment of the present invention. As shown in FIG. 10, it comprises the receiving circuit for magnetic coupling resonant wireless power transmission shown in FIG. 8, and also comprises a resonant transmitting circuit 5, a main control device 12, a sub control device 16, a voltage detection module 8 and a charging detection module 7. The resonant transmitting circuit 5 comprises a semiconductor switch 6. Those skilled in the art will appreciate that other resonant transmitting circuits are known, the specific circuit structures of which are not described in detail herein. The charging detection module 7 is configured to detect the charging status of the rechargeable battery B to determine the charging condition of the rechargeable battery B, for example to detect the voltage of the rechargeable battery B or both the voltage and charging current of the rechargeable battery B. The voltage detection module 8 is configured to detect the voltage across the storage capacitor C2. The sub control device 16 comprises a sub CPU 13, a sub transceiver module 14 and a second driver module 15. The main control device 12 comprises a main CPU 9, a main transceiver module 10 and a first driver module 11. The charging detection module 7 outputs the charging status data of the rechargeable battery B to the sub CPU 13, and the voltage detection module 8 outputs the voltage value of the storage capacitor C2 to the sub CPU 13. The sub CPU 13 is configured to transmit the charging status data and the voltage value of the storage capacitor C2 to the main CPU 9 via the sub transceiver module 14 and the main transceiver module 10. The main CPU 9 is configured to control the operating state of the semiconductor switch 6 via the first driver module 11 according to the charging status data and the voltage value of the storage capacitor C2. The sub CPU 13 is configured to control the operating states of the first switch S, the second switch S2 and the metal oxide semiconductor field effect transistor Q1 via the second driver module 15 according to the charging status data and the voltage value of the storage capacitor C2.

The control modes of the main control device 12 and the sub control device 16 will be illustrated below. The charging detection module 7 is configured to detect the voltage and charging current of the chargeable battery B and output the current voltage value and charging current value of the chargeable battery B to the sub CPU 13. The voltage detection module 8 is configured to detect the voltage across the storage capacitor C2 and output the voltage value to the sub CPU 13. The sub CPU 13 is configured to transmit the voltage value and charging current value of the rechargeable battery B and the voltage value of the storage capacitor C2 to the main CPU 9 via data transmission between the sub transceiver module 14 and the main transceiver module 10. When the voltage of the rechargeable battery B is lower than a predetermined threshold voltage and the voltage of the storage capacitor C2 is higher than another predetermined threshold voltage, the main CPU 9 provides a PFM signal to the first driver module 11, so that the first driver module 11 controls the semiconductor switch 6 to operate in the PFM mode. The sub CPU 13 is configured to control the metal oxide semiconductor field effect transistor Q1 to be in off-state and control the first switch S and the second switch S2 to be in on-state simultaneously via the second driver module 15. At this time, the resonant transmitting circuit 5 charges the rechargeable battery B with constant current. When the voltage of the rechargeable battery B is higher than or reaches a predetermined threshold voltage, the main CPU 9 outputs a driver signal to the first driver module 11 to control the semiconductor switch 6 to be in off-state, and the sub CPU 13 is configured to control the metal oxide semiconductor field effect transistor Q1 to operate in a PWM mode and control the first switch S and the second switch S2 to be in off-state simultaneously via the second driver module 15. At this time, the storage capacitor C2 discharges and charges the rechargeable battery B with constant voltage via a Boost circuit consisting of the inductor L2, the diode D5 and the metal oxide semiconductor field effect transistor Q1. When the voltage of the rechargeable battery B is higher than or reaches a predetermined threshold voltage and the voltage of the storage capacitor C2 is lower than another predetermined threshold voltage, the main CPU 9 outputs a PFM signal to the first driver module 11, so that the first driver module 11 controls the semiconductor switch 6 to operate in the PFM mode. The sub CPU 13 controls the metal oxide semiconductor field effect transistor Q1 to be in off-state and controls the first switch S and the second switch S2 to be in off-state simultaneously via the second driver module 15. At this time, the resonant transmitting circuit 5 charges the storage capacitor C2 via the resonant circuit 1 and the full bridge rectifying circuit 2. Therefore, when the voltage of the rechargeable battery B is higher than or reaches a predetermined threshold voltage, the resonant transmitting circuit 5 works intermittently, thus the storage capacitor C2 recharges and discharges alternately.

In other embodiments, the main CPU 9 outputs control commands to the sub CPU 13 via the main transceiver module 10 and the sub transceiver module 14, and the sub CPU 13 controls the operating states of the first switch S, the second switch S2 and the metal oxide semiconductor field effect transistor Q1 according to the control commands. The operating states of the first switch S, the second switch S2 and the metal oxide semiconductor field effect transistor Q1 are the same as above, which is not discussed here.

In the above embodiments, the rechargeable battery B is charged with constant voltage or constant current according to the voltage value across the chargeable battery B. Those skilled in the art will appreciate that the main CPU 9 can charge the chargeable battery B with constant current or constant voltage according to the charging current value in the rechargeable battery B. Of course, the main CPU 9 can charge the rechargeable battery B with constant current or constant voltage according to both the voltage value and charging current value of the rechargeable battery B.

Although the present invention has been described with reference to preferred embodiments, the present invention is not limited to the embodiments described herein. And the features and operations of the invention as described are susceptible to various modifications and alterations, without departing from the scope of the invention.

The invention claimed is:

1. A receiving circuit for magnetic coupling resonant wireless power transmission comprising:
   a resonant circuit comprising a resonant coil and a resonant capacitor;
   a rectifying circuit having an input electrically connected to two terminals of the resonant capacitor;
   a storage capacitor having two terminals electrically connected to an output of rectifying circuit; and
   an output circuit having an input electrically connected to the two terminals of the storage capacitor and an output configured to be electrically connected to a battery, the output circuit configured to operate as a filter in a first mode and as a boost converter in a second mode.

2. The receiving circuit for magnetic coupling resonant wireless power transmission according to claim 1, wherein the output circuit comprises an inductor, a diode and a metal oxide semiconductor field effect transistor, wherein a first terminal of the inductor is electrically connected to a first one of the two terminals of the storage capacitor, a second terminal of the inductor is electrically connected to an anode of the diode and a drain of the metal oxide semiconductor field effect transistor, a source of the metal oxide semiconductor field effect transistor is electrically connected to a second one of the two terminals of the storage capacitor, and a cathode of the diode and a source of the metal oxide semiconductor field effect transistor act as an output of the output circuit.

3. The receiving circuit for magnetic coupling resonant wireless power transmission according to claim 2, wherein the output circuit comprises a filtering capacitor and a first switch connected in series and electrically connected to the drain and source of the metal oxide semiconductor field effect transistor.

4. The receiving circuit for magnetic coupling resonant wireless power transmission according to claim 3, wherein the output circuit comprises a second switch connected in parallel with the diode.

5. The receiving circuit for magnetic coupling resonant wireless power transmission according to claim 1, wherein the rectifying circuit is a full bridge rectifying circuit.

6. A system comprising:
   a resonant wireless transmitting circuit; and
   a receiving circuit comprising:
     a resonant circuit comprising a resonant coil and a resonant capacitor;
     a rectifying circuit having an input electrically connected to an output of the resonant circuit;
     a storage capacitor having two terminals electrically connected to an output of rectifying circuit; and
     an output circuit configured to operate as a filter in first mode and as a boost converter in a second mode and comprising an inductor, a diode, a metal oxide semiconductor field effect transistor, a filtering capacitor and a first switch, wherein a first terminal of the inductor is electrically connected to a first one of the two terminals of the storage capacitor, a second terminal of the inductor is electrically connected to an anode of the diode and a drain of the metal oxide semiconductor field effect transistor, a source of the metal oxide semiconductor field effect transistor is electrically connected to a second one of the two terminals of the storage capacitor, a cathode of the diode and a source of the metal oxide semiconductor field effect transistor act as an output of the output circuit configured to be electrically connected to a battery,
     and the filtering capacitor and the first switch are connected in series between the drain and the source of the metal oxide semiconductor field effect transistor.

7. The system according to claim 6, wherein the output circuit further comprises a second switch connected in parallel with the diode.

8. The system according to claim 7, further comprising:
   a main control device including a main central processing unit (CPU), a main transceiver module and a first driver module;
   a sub control device including a sub CPU, a sub transceiver module and a second driver module;
   a charging detection module configured to detect a charging status of the battery and to provide charging status data of the battery to the sub CPU;
   a voltage detection module configured to detect a voltage of the storage capacitor and to provide a voltage value of the storage capacitor to the sub CPU;
   wherein the sub CPU is configured to transmit the charging status data and the voltage value of the storage capacitor to the main CPU via the sub transceiver module and the main transceiver module, the main CPU is configured to control a semiconductor switch of the resonant wireless transmitting circuit to operate the resonant wireless transmitting circuit in a pulse frequency modulation via the first driver module according to the charging status data and the voltage value of the storage capacitor, and the sub CPU is configured to control the metal oxide semiconductor field effect transistor to switch off and control the first switch and the second switch to be in on-state or off-state simultaneously via the second driver module according to the charging status data and the voltage value of the storage capacitor; or
   the sub CPU is configured to transmit the charging status data and the voltage value of the storage capacitor to the main CPU via the sub transceiver module and the main transceiver module, the main CPU is configured to control the semiconductor switch of the resonant wireless transmitting circuit to switch off via the first driver module according to the charging status data and the voltage value of the storage capacitor, the sub CPU is configured to control the metal oxide semiconductor field effect transistor to operate in a pulse width modulation and control the first switch and the second switch to be in off-state simultaneously via the second driver module according to the charging status data and the voltage value of the storage capacitor.

9. A method of operating the system according to claim 8, the method comprising:
   (a) when the voltage of the battery is lower than a first predetermined threshold voltage, controlling the resonant transmitting circuit to operate in a pulse frequency modulation and the metal oxide semiconductor field effect transistor to switch off; and
   (b) when the voltage of the battery is higher than the first predetermined threshold voltage, controlling the resonant transmitting circuit to work intermittently, wherein:
     when the voltage value of the storage capacitor is higher than a second predetermined threshold voltage, controlling the resonant transmitting circuit to switch off and the metal oxide semiconductor field effect transistor to operate in a pulse width modulation, so that the storage capacitor charges the battery; and when the voltage value of the storage capacitor is lower than the second predetermined threshold voltage, controlling the resonant transmitting circuit to operate in a pulse frequency modulation and the metal oxide semiconductor field effect transistor to switch off, so that the resonant transmitting circuit charges the storage capacitor via the resonant circuit and the rectifying circuit.

10. The method according to claim 9, wherein the receiving circuit further comprises a filtering capacitor and a first switch, wherein the filtering capacitor and the first switch are connected in series and electrically connected to the drain and source of the metal oxide semiconductor field effect transistor, and wherein the method further comprises:

in the step (a), controlling the first switch to switch on; and in the step (b), controlling the first switch to switch off.

11. The method according to claim 10, wherein the receiving circuit further comprises a second switch connected in parallel with the diode, and wherein the method further comprises:

in the step (a), controlling the second switch to switch on; and in the step (b), controlling the second switch to switch off.

12. An apparatus comprising:

a resonant circuit comprising a resonant coil and a resonant capacitor;

a rectifying circuit having an input electrically connected to the resonant capacitor;

a storage capacitor electrically connected to an output of rectifying circuit; and an output circuit having an input electrically connected to the storage capacitor and an output configured to be connected to a battery, the output circuit further configured to operate as a filter in a first mode and as a boost converter in a second mode.

13. The apparatus of claim 12: wherein the output circuit comprises:

an inductor having first terminal connected to the storage capacitor;

a diode having an anode connected to a second terminal of the inductor and a cathode configured to be connected to a first terminal of the battery;

a transistor having a first terminal connected to the anode of the diode and the second terminal of the inductor and a second terminal configured to be connected to a second terminal of the battery; and a filter capacitor and switch connected in series between the second terminal of the inductor and the second terminal of the battery.

14. The apparatus of claim 13, further comprising a control circuit configured to close the switch in the first mode and to open the switch in the second mode.

15. The apparatus of claim 14, wherein the switch comprises a first switch and further comprising a second switch connected in parallel with the diode.

16. The apparatus of claim 15, wherein the control circuit is configured to close the switch in the first mode and to open the switch in the second mode.

17. The apparatus of claim 12, further comprising a resonant wireless transmission circuit wirelessly coupled to the resonant circuit and configured to operate in a pulse frequency modulation (PFM) when the output circuit is in the first mode and to be deactivated when the output circuit is in the second mode.

18. The apparatus of claim 17, further comprising a control circuit configured to control the resonant wireless transmission circuit and the output circuit responsive to a state of the battery and/or a state of the storage capacitor.

* * * * *